United States Patent

[11] 3,603,809

[72] Inventor Yasuji Uchiyama
Hamakita-shi, Japan

[21] Appl. No. 365
[22] Filed Jan. 2, 1970
[45] Patented Sept. 7, 1971

[73] Assignee Nippon Gakki Seizo Kabushiki Kaisha
Hamamatsu-shi, Japan

[32] Priority Jan. 11, 1969, , Jan. 31, 1969, Jan. 31, 1969, Jan. 31, 1969, Jan. 31, 1969, Feb. 3, 1969
[33] Japan
[31] 44/2220, 44/2221, 44/6642, 44/6643, 44/6644, 44/6645, 44/9291

[54] FREQUENCY-DIVIDED SAWTOOTH WAVE GENERATING CIRCUIT
10 Claims, 62 Drawing Figs.

[52] U.S. Cl. .......... 307/228, 84/1.22, 84/1.23, 328/16, 328/35, 328/156, 328/181
[51] Int. Cl. .......... H03k 4/08
[50] Field of Search .......... 84/1.11, 1.12, 1.19, 1.20, 1.21, 1.23, 1.22; 307/228; 328/15, 16, 18, 20, 23, 25, 156, 151, 181, 35, 36

[56] References Cited
UNITED STATES PATENTS

| | | | |
|---|---|---|---|
| 2,583,012 | 1/1952 | Parker .......... | 328/157 X |
| 2,848,616 | 8/1958 | Tollefson .......... | 328/156 X |
| 3,255,363 | 6/1966 | Stella .......... | 307/237 X |
| 3,395,363 | 7/1968 | McGrath et al. .......... | 307/228 X |
| 3,443,463 | 5/1969 | Campbell .......... | 307/228 X |
| 3,532,799 | 10/1970 | Kamecka et al. .......... | 84/1.12 |
| 3,535,431 | 10/1970 | Szabo .......... | 84/1.11 |

*Primary Examiner*—Donald D. Forrer
*Assistant Examiner*—R. C. Woodbridge
*Attorney*—Holman & Stern

ABSTRACT: A circuit consisting of a square wave frequency divider which converts its input sawtooth wave having a frequency $f$ into an output square wave having a frequency $f/2$ and a mixer for mixing said output wave and said input sawtooth wave by equal peak amplitudes, said circuit being a principal circuit of the invention and being used to produce a sawtooth wave having a frequency $f/2$.

A plurality of stages each consisting of the circuit mentioned above are successively connected in cascade, whereby a plurality of sawtooth waves having frequencies which are successively divided are produced.

Furthermore, modifications of the circuits mentioned above are described.

FIG. 8
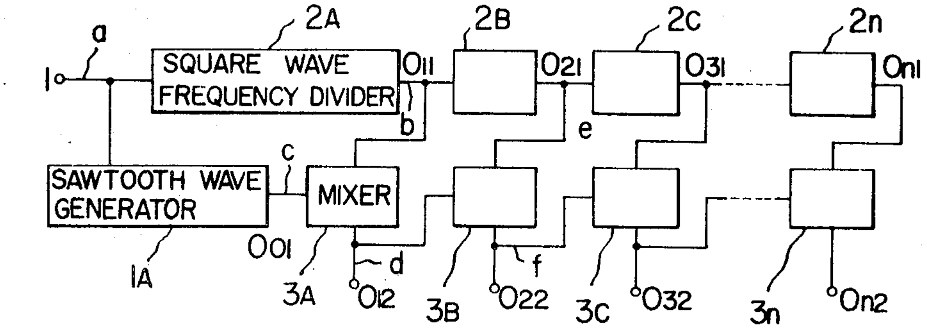
FIG. 9 (a)
FIG. 9 (b)
FIG. 9 (c)
FIG. 9 (d)
FIG. 9 (e)
FIG. 9 (f)
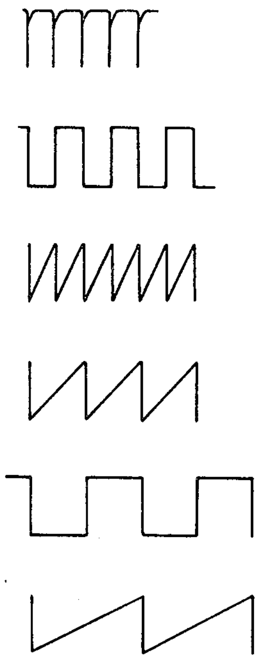

FIG. 10
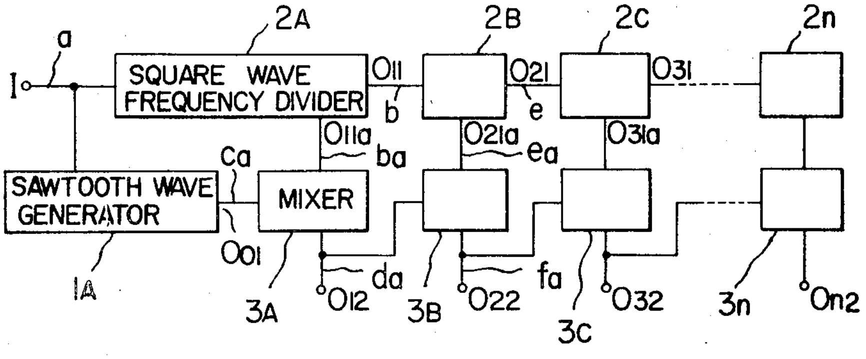
FIG. 11 (a)
FIG. 11 (b)
FIG. 11 (ba)
FIG. 11 (ca)
FIG. 11 (da)
FIG. 11 (e)
FIG. 11 (ea)
FIG. 11 (fa)
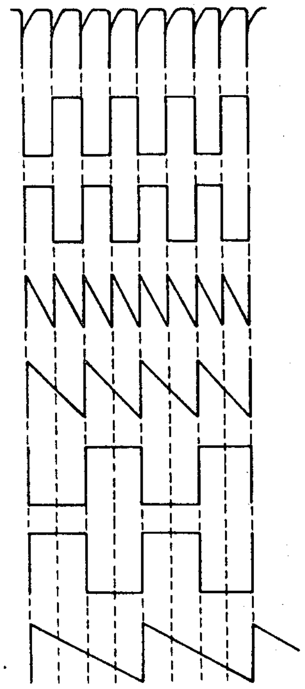

FREQUENCY-DIVIDED SAWTOOTH WAVE GENERATING CIRCUIT

BACKGROUND OF THE INVENTION

The present invention relates to improved frequency-divided sawtooth wave generating circuit which can convert its input wave having a frequency $f$ into a sawtooth wave having the frequency of $f/2$ or into a plurality of sawtooth waves having, respectively, frequencies $f/2$, $f/$ 4,—and to modifications thereof.

Hitherto, a frequency dividing circuit comprising cascaded flip-flop circuits (bistable multivibrators) or cascaded blocking oscillator circuits has been conventionally used as frequency divider for use in electronic musical instruments. However, the conventional frequency dividers mentioned above have various disadvantages as well as various advantages. That is, since the frequency divider utilizing flip-flop circuits having the same element values can carry out frequency dividing operation within a broad frequency range having no limitation, it is very easy to manufacture said frequency dividers in the case when a plurality of the frequency dividers are to be used, but since their output waves are of square form and contain only harmonic frequencies of odd order without containing harmonic frequencies of even order, it is unfavorable for producing all the timbres necessary for musical instrument, which means that it is not very good for practical use as said output waves are incomplete as sound source.

On the other hand, output wave of the frequency divider comprising cascaded blocking oscillator circuits is of sawtooth form, so hat said output wave have all of harmonic components, thus causing favorable production of timbres of any musical instrument, which means that said frequency divider is ideal as the sound source. However, the blocking oscillator circuit itself is liable to produce a self running oscillation of a particular frequency in the case when any synchronizing means is not applied thereto, that is, said circuit includes therein a time-constant circuit time-constant of which is determined by a capacitor's capacitance, a resistor's resistance, characteristics of active elements, bias voltage, power source voltage, and the like. Accordingly, the blocking oscillator circuit is affected by fluctuation of the above-mentioned values of various elements and variation of voltages and temperature, whereby frequency of the self-running oscillation is liable to be varied. Furthermore, when the blocking oscillation circuit is used as ½ frequency divider by applying synchronization thereto, frequency of the input synchronous signal is required to be higher than double value and lower than triple value of its self-running oscillation frequency, so that its operating frequency is limited. Accordingly, for the purpose of obtaining a desired operation, frequency, values of the circuit elements such as capacitors and resistors should be selected so as to be matched with said desired frequency, and in the case of using the frequency divider as a sound source circuit of any musical instrument, elements of the circuit should be individually designed so as to be mutually different from elements of each other circuit, in order to cover frequency range over several octaves, thus causing difficulty of manufacture of the circuits. Furthermore, as sound frequency approaches bass region, larger time-constant is required. In this case, capacitor of larger capacity is required, thus causing higher cost and bulkness of the circuit.

SUMMARY OF THE INVENTION

It is essential object of the invention to provide a frequency-divided sawtooth wave generating circuit having no such disadvantages of the conventional frequency dividing circuits as mentioned above and being favorably adapted to produce a sound source of any electronic musical instrument, and more particularly to provide a frequency-divided sawtooth wave generating circuit in which resistors, capacitors and the like constituting said circuit have no relation to the output frequency and their temperature characteristics do not affect the operating frequency.

It is other object of the invention to provide a frequency-divided sawtooth wave generating circuit, in which a plurality of sawtooth waves having, respectively, successively divided frequencies and or a plurality of square waves having, respectively, successively divided frequencies can be obtained in a simple and economical manner.

It is a further object of the invention to provide a frequency-divided sawtooth wave generating circuit, in which various frequencies of the circuit are very stable and sure.

The foregoing and other objects as well as the characteristic features of the invention will become more apparent and more readily, understandable by the following description and the appended claims when read in conjunction with the accompanying drawings, in which same or equivalent members are designated by the same numerals and characters.

The principal subject concept of the invention resides in a frequency-divided sawtooth wave generating circuit consisting of a square wave frequency divider which converts its input sawtooth wave having a frequency $f$ into its output square wave having a frequency of $f/2$ and an electric mixer (hereinbelow, will be merely denoted as "mixer") for mixing said output square wave and said input sawtooth wave, peak amplitudes of said waves being made equal to or nearly equal to each other, whereby a sawtooth wave having a frequency of $f/2$ is derived from output terminal of said mixer.

DETAILED DESCRIPTION OF THE DRAWINGS

Figure 1:
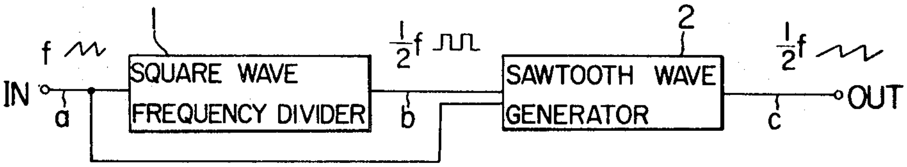
FIG. 1 is a block diagram showing a principal circuit of a frequency-divided sawtooth wave generating circuit according to the present invention.
Figure 16A:
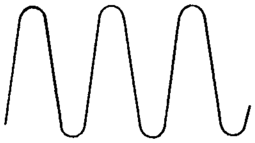
Figure 15:
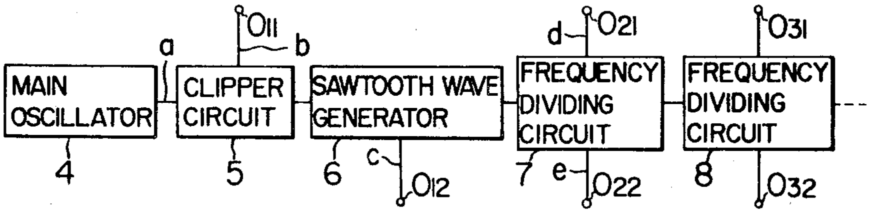
Figure 3:
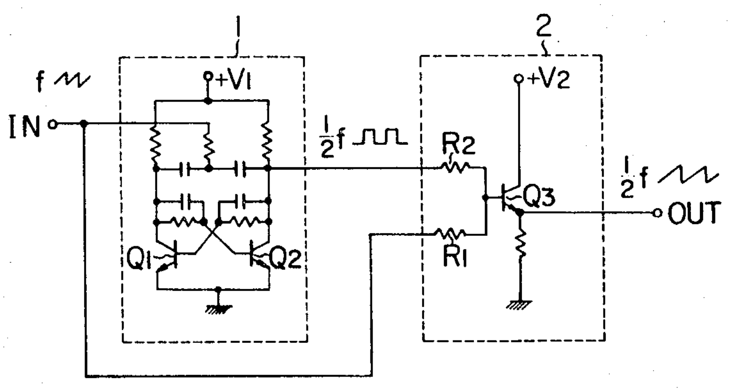
Figure 4:
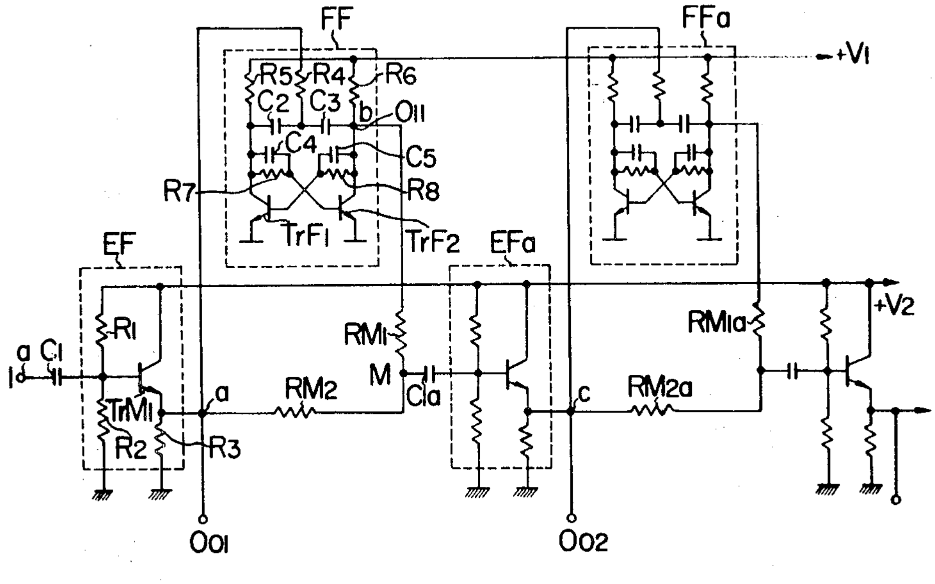
Figures 5, 6:
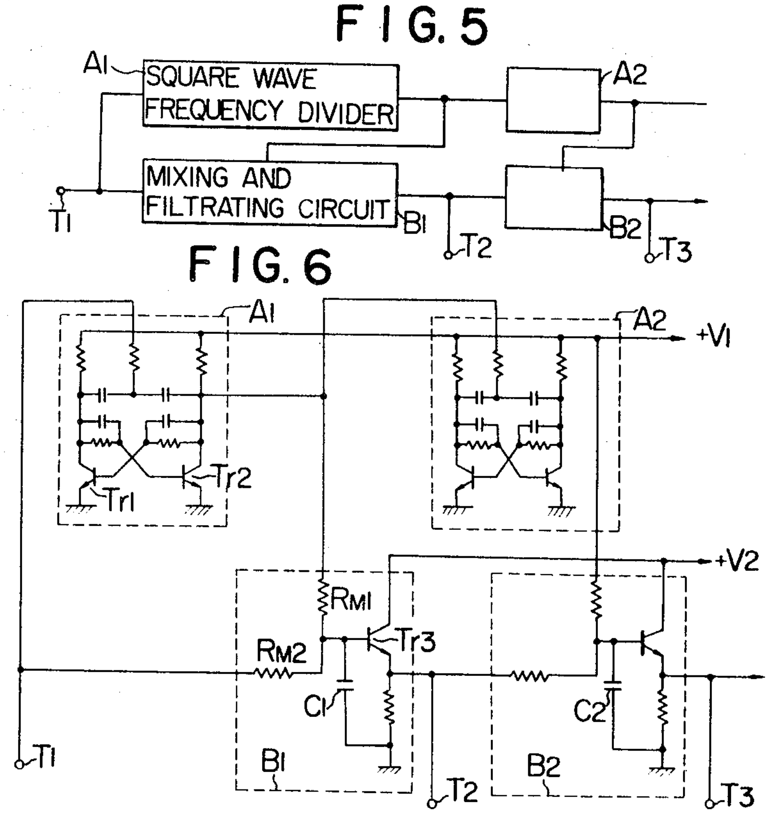
Figure 7A:
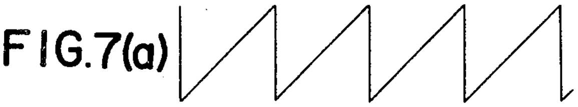
Figure 7B:
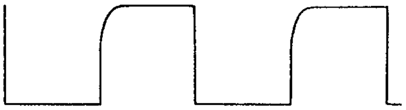
Figure 7C:
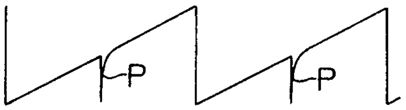
Figure 7D:
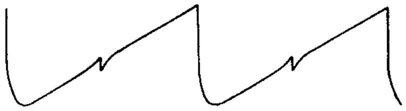
Figure 12:
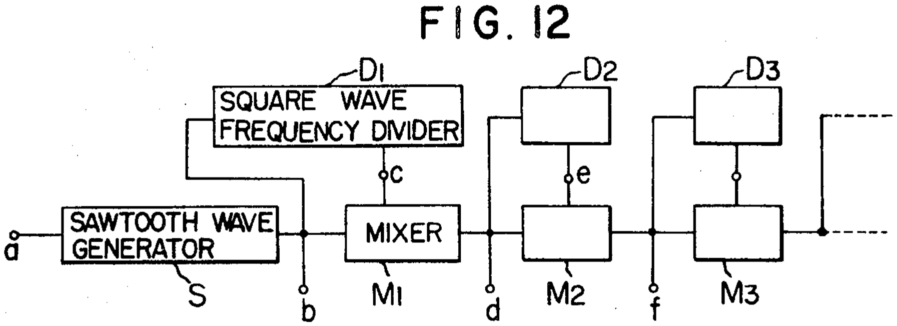
Figure 13:
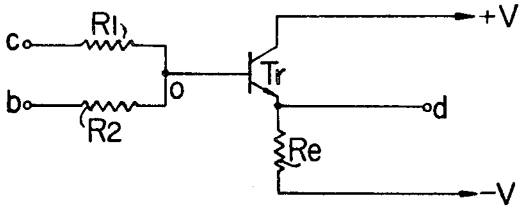
Figures 14A, 14B, 14C, 14D, 14E, 14F:
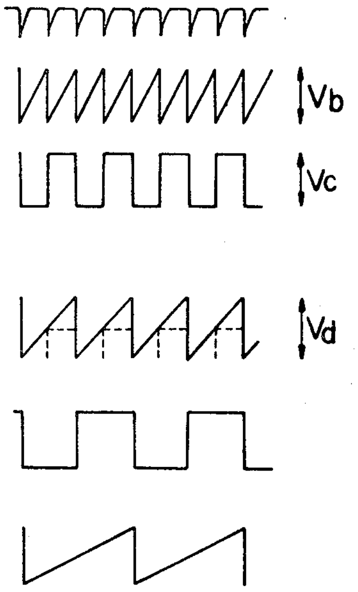
Figure 17:
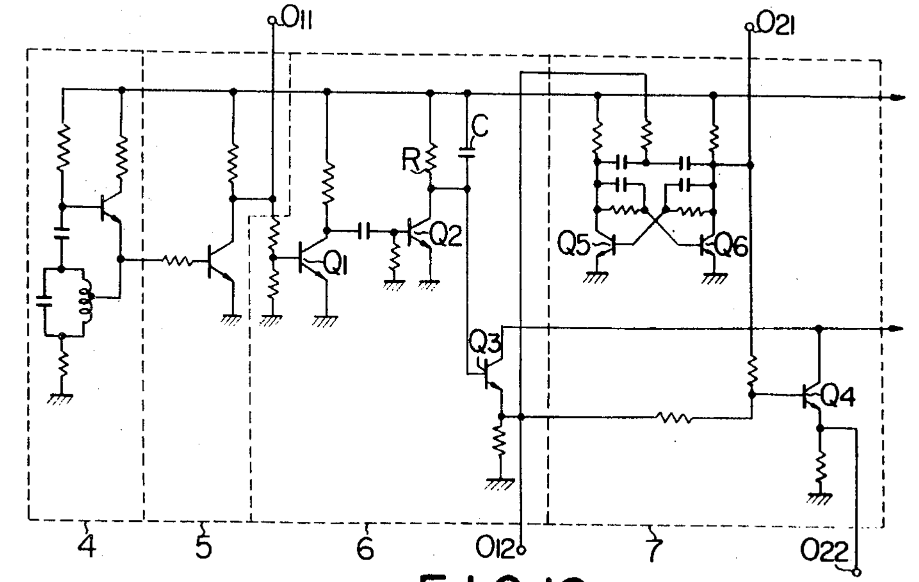
Figure 18:
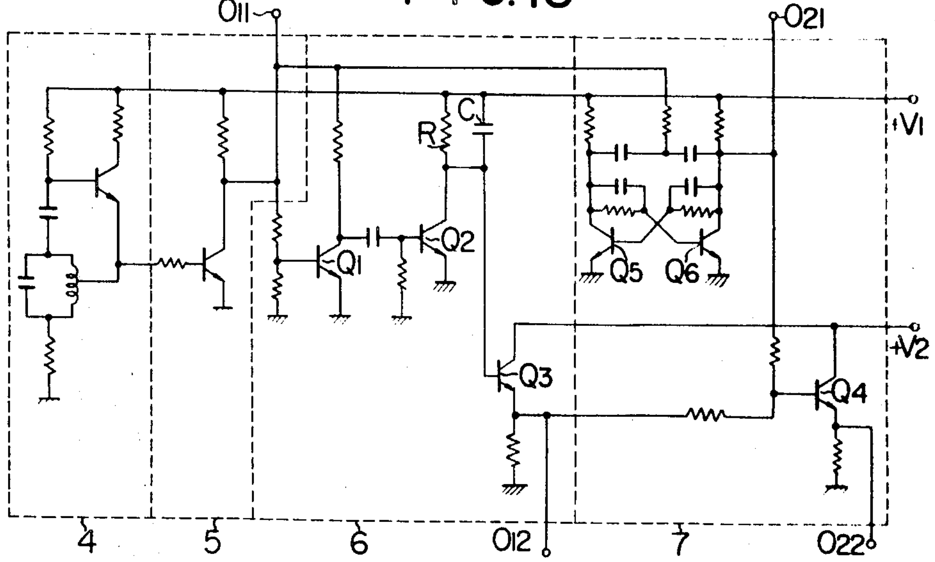
Figure 19:
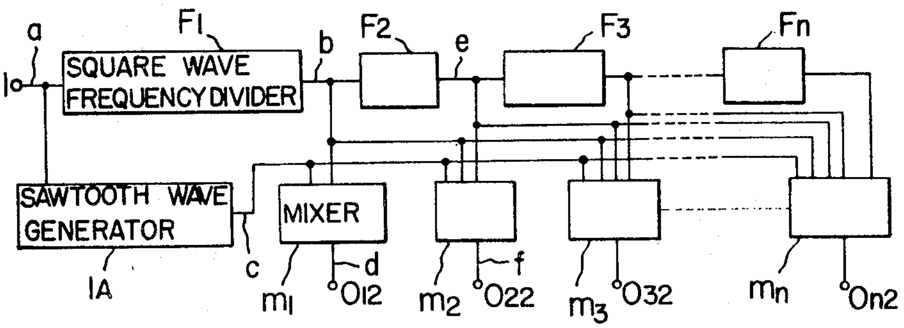
Figures 20A, 20B, 20C, 20D, 20E, 20F, 20G, 20H:
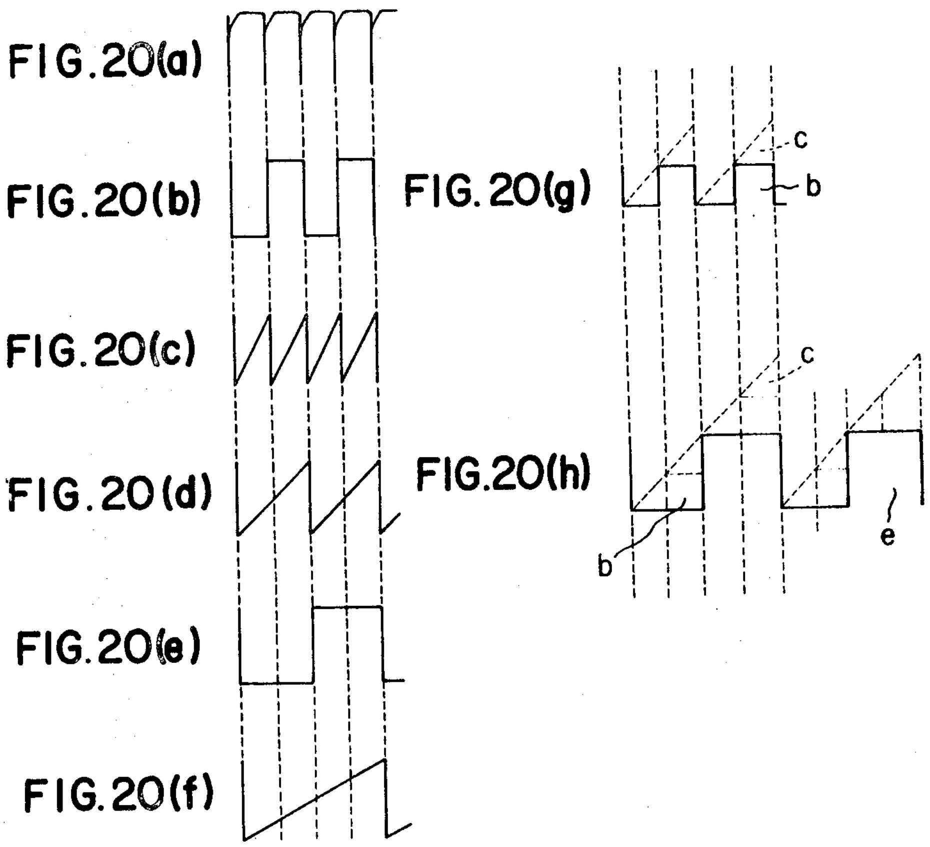
Figure 21:
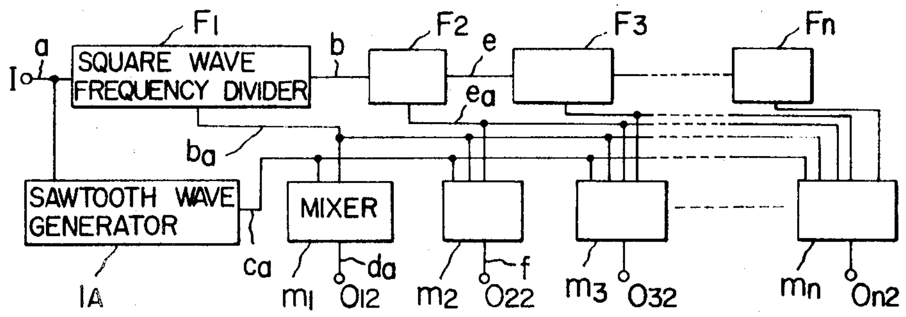
Figures 22, 22A, 22B, 22E, 22F:
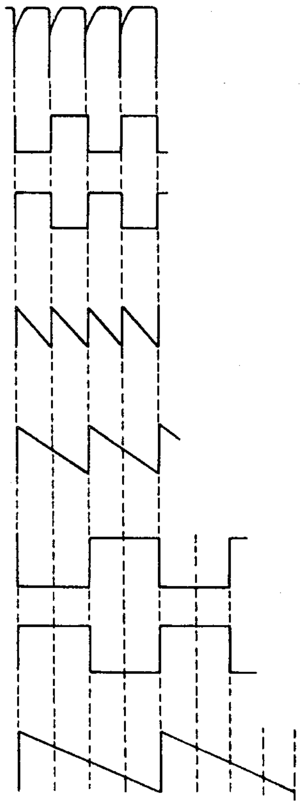

FIG. 3 sows a circuit connection diagram of the principal circuit shown in FIG. 1;

FIG. 4 shows a circuit connection diagram of one embodiment of the invention, to which the principal circuit shown in FIG. 1 is applied for;

FIG. 5 shows a circuit block diagram of other embodiment of the invention, in which two stages of the principal circuits according to the circuit of FIG. 1 are connected in cascade and a filter device is provided in the mixer;

FIG. 6 shows a circuit connection diagram of the embodiment of FIG. 5;

FIG. 7 (*a*), (*b*), (*c*), (*d*) shows wave forms at input side and output side off the circuit shown in FIG. 6;

FIG. 8 shows a circuit block diagram of an embodiment showing an application of the principal circuit shown in FIG. 1, in which a series of frequency-divided sawtooth waves are successively produced;

FIG. 9 (*a*), (*b*), (*c*), (*d*), (*e*), (*f*) shows wave forms at various points of the circuit illustrated in the embodiment of FIG. 8;

FIG. 10 shows a circuit block diagram of a modification of the embodiment of FIG. 8;

FIG. 11 (*a*), (*b*), (*ba*), (*ca*), (*da*), (*e*), (*ea*), (*fa*) shows wave forms at various points of the circuit illustrated in the embodiment of FIG. 10;

FIG. 12 shows a circuit block diagram of an embodiment showing other application of the principal circuit according to FIG. 1, in which a series of sawtooth waves having respectively, successively divided frequencies are easily produced;

FIG. 13 shows a circuit connection diagram showing actual circuit of a mixer used in the embodiment of FIG. 12;

FIG. 14 (*a*), (*b*), (*c*), (*d*), (*e*), (*f*) shows wave forms at various points of the circuit in the embodiment of FIG. 12;

FIG. 15 shows a circuit block diagram of a sound source circuit according to the invention;

FIG. 16 (*a*), (*b*), (*c*), (*d*), (*e*) shows wave forms at various points of the circuit shown in FIG. 15;

FIG. 17 shows a detailed circuit connection diagram of the sound source illustrated in FIG. 15, excluding the second stage of frequency dividing circuit;

FIG. 18 shows a detailed circuit connection diagram of a modification of the embodiment shown in FIG. 15;

FIG. 19 shows a block diagram of a circuit for producing a plurality of successively divided sawtooth waves, to which the principal circuit according to the invention is applied;

FIG. 20 (*a*), (*b*), (*c*), (*d*), (*e*), (*f*), (*g*), (*h*) shows wave forms at various points of the circuit of FIG. 19;

FIG. 21 sows a block diagram of a modification of the circuit shown in FIG. 19, in which phases of the output sawtooth waves are made reverse to those in the circuit of FIG. 19; and FIG. 22 (*a*), (*b*), (*ba*), (*Ca*), (*da*), (*e*), (*Ca*), (*f*), sows wave forms at various points of the circuit of FIG. 21.

DETAILED DESCRIPTION OF THE INVENTION

Figure 2A:
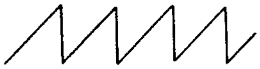
FIG. 2 shows wave forms at positions (*a*), (*b*) and (*c*) of the circuit shown in FIG. 1.
Figure 16B:
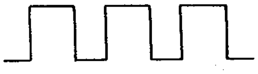
Figure 2B:
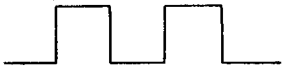
Figure 16C:
Figure 2C:
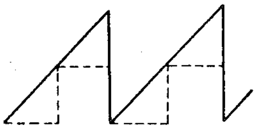
Figure 16D:
Figure 16E:
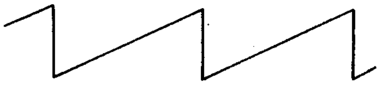

Referring to FIGS. 1 and 2, a sawtooth wave shown in FIG. 2(*a*) and having a frequency *f* is applied to a square wave frequency divider 1 from its input terminal IN, whereby a square wave shown in FIG. 2(*b*) and having a frequency *f*/2 is derived from output terminal of said divider 1. As the frequency divider 1, any kind of frequency divider may be used so far as it can produce an output having a frequency of *f*/2. The output wave of the frequency divider 1 and the sawtooth wave having a frequency *f* are introduced into a mixer 2 and mixed therein, levels (peak amplitudes) of said waves being made to be mutually equal to each other, whereby a sawtooth wave shown in FIG. 2(*c*) and having a frequency of *f*/2 can be effectively obtained at output terminal OUT of the mixer.

FIG. 3 shows an example to which a frequency dividing circuit according to the invention is applied. The circuit of FIG. 3 comprises a square wave frequency divider 1 consisting of a bistable multivibrator composed of transistors Q1 and Q2, in which a sawtooth wave having a frequency *f* and applied to an input terminal IN is divided, whereby a square wave having a frequency of *f*/2 is produced. On the other hand, the sawtooth wave having a frequency *f* is applied to base of a transistor Q3 through a resistor R1 and the output wave of the frequency divider 1 is applied to said base through a resistor R2, peak amplitude of said output wave being made to be equal to that of said sawtooth wave, whereby a sawtooth wave having a frequency of *f*/2 and obtained by superposition of both kinds of the sawtooth and square waves can be obtained as the output from the output terminal OUT. Accordingly, by connecting the circuits such as shown in FIG. 3 in cascade, it is possible to obtain sawtooth waves having, respectively, frequencies $f/2, f/2^2, \ldots f/2^n$, where *n* represents an integer.

In the circuits mentioned above, object of the invention can be effectively attained in practice even when mixing levels of the square wave having a frequency of *f*/2 and the sawtooth wave having a frequency *f* are not completely equal to each other or they are not strictly square form and sawtooth form.

According to the circuits mentioned in connection with FIGS. 1, 2 and 3, since division of any sawtooth wave can be attained by use of a relatively simple circuit and since circuit elements composing the frequency divider have no parts having relation to the frequencies, there are various advantages such that same circuits can be used, manufacture becomes easy, characteristics are not affected by temperature variation and aging. Accordingly, when the circuit according to the invention is used as a frequency dividing type sound of any musical instrument, it is very effective.

Referring to FIG. 4, an input terminal I is connected t base of a transistor I*r*M1 through a capacitor C1 for coupling, collector of said transistor T*r*M1 is connected to a voltage source +V21, resistors R1 and R2 are connected respectively between the collector and base of said transistor and between said base and the ground, and a resistor $R_3$ is connected between the ground and emitter of said transistor, whereby an emitter follower EF for impedance conversion is formed. In FIG. 4, the circuit FF is a flip-flop circuit comprising transistors T*r*F1 F1 and T*r*F2 F2 and designed to produce a square wave having a frequency corresponding to one-half of that of the input wave thereof, collectors of said transistors being connected respectively to the emitter of the emitter follower EF through a resistor R4 and capacitors C2 and C3, collector of each of said transistors being connected to base of the other transistor through respective resistors R5, R6 and capacitors C4, C5 and to voltage source V1 through respective resistors R5, R6, and emitters of said transistor being connected to the ground.

The emitter of the transistor T*r*M1 and the collector of the transistor T*r*F2 are connected through mixing resistors RM2, and RM1, a middle point M of said resistor being connected, through a capacitor C1*a*, to base of a second emitter follower EF*a*. The second stage consists, in the same manner as the first stage mentioned above, of an emitter follower EF*a* for impedance conversion, a flip-flop circuit EF*a* for forming a square wave having a frequency divided to one-half and mixing resistors RM1*a* and RM2*a*.

Of course, if a further large frequency-dividing ratio is required, necessary stages more than two may be connected in cascade.

In the circuit of FIG. 4, when a sawtooth wave such as shown in FIG. 2(*a*) is applied to the input terminal I, said wave is amplified by means of the emitter follower EF, whereby a sawtooth wave signal having the same amplitude and sawtooth wave form as those of the input wave appears at terminal O*o*1. Thus signal produced at the terminal O*o*1 is applied, on other hand, to he circuit EF as its trigger signal, whereby such square wave having a frequency corresponding to one-half of that of the input sawtooth wave as shown in FIG. 2(*b*) is produced at a point O11 of said circuit EF. The sawtooth wave signal at the terminal O*o*1 o1 and the square wave at the point O11 are mixed at the point M through mixing resistors RM2 and RM1. In this case, if said both waves are mixed in the same peak amplitude, an output signal consisting of sawtooth wave having a frequency corresponding to one-half of that of input sawtooth wave signal is produced at the terminal O*o*2, said output signal being shown in FIG. 2(*c*.

The conditions for obtaining the sawtooth wave as shown in FIG. 2(*c*) are as follows. That is, when the sawtooth and square waves to be mixed are same in their peak amplitude (wave height) and the circuit constants are represented by the following equation, mixing loss of each of the waves to be mixed becomes one-half and level of the sawtooth wave obtained by mixing and having a frequency corresponding to one-half of the input frequency becomes equal to the amplitude of each of the waves prior to their mixing.

$$RM1{+}{+}ro11 = RM2{+}M2{+}1 << z2 \quad ,$$

where *RM*1, *RM*2, *ro*11, *roo*1, and *Z*2 represent, respectively, resistance value of the mixing resistor *RM*1, resistance value of the mixing resistor *RM*2, internal resistance of the flip-flop circuit FF viewed from the point O11, internal resistance of the emitter follower EF viewed from the output terminal O*o*1 of said circuit, and a load impedance at the middle point M (succeeding side).

In this case, the transistor T*r*M1 corresponds to an emitter follower and operates as a class A amplifies, so that *roo*1 is sufficiently low constant value, and furthermore, since the transistor T*r*F2 carries out on-off operation, resistance value of the resistor *ro*11 varies in the range between almost zero and collector resistance of said transistor T*r*F2.

Now, let it be assumed that $$RM1 >> ro11;\ RM2 >> roo1,$$

the following result may be established $$R_{M_1} \simeq R_{M_2}$$

Accordingly, if the case in which *RM*1<<*Z* is considered, mixing losses of the wave, such as shown in FIGS. 2(*a*) and (*b*), appearing at the point M become approximately one-half, whereby it becomes possible to make wave height of the output sawtooth wave such as shown in FIG. 2(*c*) equal to those of the input sawtooth wave signal (FIG. 2(*a*) and square wave signal (FIG. 2*b*). Accordingly, input signal of the second stage becomes substantially equal to the input signal of the first stage, thus causing easy manufacture of multistage frequency dividing circuit.

In the embodiments of FIGS. 3 and 4, in practice the frequency-divided output sawtooth wave may include various pulses which are not necessary for sound signal, occurrence of said pulses being caused by difference between a building-up and a building-down of the square wave. These unfavorable pulses can be effectively eliminated according to the embodiment illustrated in FIGS. 5 and 6.

FIG. 5 shows a circuit block diagram for showing a frequency-divided sawtooth wave generating circuit according to the invention, said circuit comprising a square wave frequency divider A1 which converts its input sawtooth wave applied terminal T1 into an output square wave having a frequency corresponding to one-half of that of said input sawtooth wave, a mixing an filtering circuit B1 adapted to mix said input sawtooth wave and said output square wave of said frequency divider A1 and to remove unnecessary pulses from the output wave thereof, another square wave frequency divider A2 having the same structure as that of the frequency divider A1 and adapted to convert the output square wave of the frequency divider A1 into a square wave having a frequency corresponding to one-half of the frequency of said output square wave of said divider A1, and another mixing and filtering circuit B2 having the same structure as that of the circuit B1 and adapted to mix the sawtooth wave from the circuit B1 and the output square wave of the frequency divider A1 and to remove unnecessary pulses from output of said circuit B2. 2.

The circuit of FIG. 5 includes two stages which are connected in cascade, but multiple more than two may be combined in the same way as that mentioned above.

In a sound source of any electronic musical instrument, it is necessary to use multistages for frequency division. Accordingly, flip-flop circuits such as illustrated by A1, A2, ... in FIG. 5 are preferably used as the square wave frequency dividers from economical and secure-operational point of view. However, in the case of using the flip-flop circuit, building-up of the output wave is very rapid in the case of establishment of on-state of the transistor Tr2 and building-down of said output wave is relatively slow in the case of establishment of off-state of the transistor Tr2, as shown in FIG. 7(*b*). Accordingly, the sawtooth wave obtained by mixing the wave shown in FIG. 7(*b*) with the sawtooth wave shown in FIG. 7(*a*) becomes as shown in FIG. 7(*c*), in which unnecessary pulses are contained. These unnecessary pulses are very unfavorable for timbers belonging to high pass type such as string oboe and the like.

For the purpose of suppressing the unnecessary pulses mentioned above, in the embodiment of FIG. 5, a filter element for suppressing said pulses is provided in each of the circuits B1, B2, ....

FIG. 6 shows a detailed connection diagram of the embodiment of FIG. 5, in which mixing resistors are represented by characters RM1 and RM2 and filter circuits are represented by characters C1 and C2.

The circuit shown in FIG. 8 comprises an input terminal I to which a trigger signal such as shown in FIG. 9(*a*) is applied; a sawtooth wave generator 1A receiving said trigger signal thereinto and generating a sawtooth wave having a frequency *f* equal to that of said trigger signal; a square wave frequency divider 2A which converts said trigger signal into a square wave having a frequency of *f*/2; square wave frequency dividers 2B, ...... 2*n* each of which converts, respectively, output square wave of just preceding square wave frequency divider into a square wave having a frequency corresponding to one-half of that of said output square wave; a mixer 3A for mixing output wave of said sawtooth wave generator 1A and output wave of said frequency divider 2A thereby to produce at its output side a sawtooth wave; and mixers 38 ...... 3*n* each of which mixes, respectively, output sawtooth wave of just preceding mixer and output square wave of corresponding frequency divider thereby o produce a sawtooth wave at its output side.

In the circuit of FIG. 8; when a trigger signal such as shown in FIG. 9(*a*) and having a frequency *f* is applied to an input terminal I, a square wave such as shown in FIG. 9(*b*) and having a frequency of *f*/2 is produced at output terminal $O_{11}$ of the frequency divider 2A. On the other hand, a sawtooth wave such as shown in FIG. 9(*c*) and having the same frequency *f* and same pulse and building up the time as those of said trigger signal is produced at output side of the sawtooth wave circuit 1A. The square wave from the terminal O11 of the frequency divider 2A and the sawtooth wave from the terminal O*o*1 of the sawtooth wave generator 1A are mixed in the mixer 3A in such a manner that their amplitudes are same to each other, whereby a sawtooth wave such as shown in FIG. 9(*d*) and having a frequency of *f*/2 is produced at the output terminal O12 of said mixer 3A. Output square wave (such as shown in FIG. 9(*e*) of the frequency divider 2B and output sawtooth wave (shown in FIG. 9(*d*)) of the mixer 3A are mixed in the mixer 3B in such a manner that their amplitudes are same to each other, whereby a sawtooth wave such as shown in FIG. 9(*f*) and having a frequency of *f*/4 is produced at output terminal O22 of the mixer 3B. In the same manner as mentioned above, sawtooth waves having, respectively, frequencies of *f*/8, *f*/16 ... are successively produced at respective output sides of the mixers 3C, 3D. ....

In the circuit of FIG. 8, it is necessary to make pulse building-up time of the output sawtooth wave of the generator 1A to be coincident with the pulse building up time of the trigger signal to be applied to the frequency divider 2A. Accordingly, it may be possible to apply the input sawtooth wave of the generator 1A, instead of the trigger signal at the input terminal I, to the frequency divider 2A.

The embodiment illustrated in FIG. 10 relates to a modification of the circuit illustrated in FIG. 8, that is, the circuit of FIG. 8 relates to a sawtooth wave frequency dividing circuit, whereby sawtooth waves having, respectively, phases reverse to those of the divided sawtooth wave obtained in the circuit of FIG. 8 are obtained.

According to the circuit of FIG. 10, the sawtooth wave generator 1A is made to produce a sawtooth wave such as shown in FIG. 11(*a*) and having a phase reverse to that of the wave shown in FIG. 9(*c*) by means of a trigger signal such as shown in FIG. 11(*a*) and applied to the input terminal I, and output square wave of the frequency divider 2A is made to be shown in FIG. 11(*ba*) and to have a phase reverse to that of the case of FIG. 10, whereby a sawtooth wave such as shown in FIG. 11(*da*) can be obtained at the output terminal $O_{12}$ of the mixer 3A. In such a manner mentioned above, the circuit of FIG. 10 is connected in such a manner as that trigger square wave of the succeeding stage and square waves to be applied respectively to the mixers 3A, 3B, ..... are made to be mutually reverse phase and these are applied to input sides of the mixers 3A, 3B, ..... from the terminals $O_{11}aO_{12}a$ ... .

In the embodiments of FIGS. 8 and 10, it is assumed that the trigger signal to be applied to the input terminal I has a negative polarity, but it may be possible to use a trigger signal having positive polarity, with similar effect, if the flip-flops are of a positive pulse triggered type including PNP transistors. Referring to the embodiment of FIG. 12, the circuit comprises a sawtooth wave generator S which can be triggered by means of a trigger signal applied to its input terminal *a*, output terminal *b* of said generator being connected to an input terminal of a frequency divider $D_1$ and to one input terminal of a mixer $M_1$. The frequency divider $D_1$ is preferably composed of a flip-flop circuit, output terminal of said divider being connected to another input terminal *c* of the mixer $M_1$. The mixer $M_1$ consists of, as clearly shown in FIG. 13, two mixing resistors $R_1$ and $R_2$ having the same resistance, one end of one resistor $R_1$ being connected to one end of of the resistor $R_2$ at a point O, and a transistor Tr bars of which is connected to said point C, emitter and collector of said transistor being respectively connected to a negative voltage source (−V) through an emitter resistor $R_e$ and to a positive voltage source (+V). The left side ends of the mixing resistors $R_1$, $R_2$ are used as the input terminals of the mixer $M_1$ and connected, respectively, to output terminals *b* and *c* of the sawtooth wave generator S and the frequency divider $D_1$, but in this case it is important that wave amplitudes of the sawtooth wave at the terminal *b* and the square wave at the terminal *c* are equal to each other. The second frequency divider $D_2$ and mixer $M_2$ are connected to output terminal *d* of the mixer $M_1$ in cascade, said divider $D_2$ and mixer $M_2$ having respectively the same structures as those of the frequency divider $D_1$ and mixer $M_1$.

In the same manner above, further stages of frequency dividing circuit may be successively connected in cascade.

In the circuit of FIG. 12, if a trigger signal having a frequency *f* and shown in FIG. 14 (*a*) is applied to the input terminal of the generator S, a sawtooth wave shown in FIG. 14(*b*) is produced in synchronism with said trigger signal. This produced sawtooth wave is connected to a square wave in the frequency divider $D_1$, whereby a square wave such as shown in FIG. 14(*c*) and having a frequency of *f*/ 2 is produced and introduced into the mixer $M_1$. Since, as described already, resistance values of the mixing resistors $R_1$ and $R_2$ are equal to each other and their output levels are mutually equal, the sawtooth wave shown in FIG. 14(*b*) and the square wave shown in FIG. 14(*c*) are mixed as shown in FIG. 14(*d*) in the mixer $M_1$) whereby a sawtooth wave having been converted so as to have a frequency of *f*/ 2 can be produced at the output side of said mixer $M_1$. If output amplitude $V_b$ of the sawtooth wave shown in FIG. 14(*d*) is sufficiently larger than the current amplification coefficient of the transistor $T_r$, input impedance viewed from the point O can be made to be sufficiently larger than the resistance values of the mixing resistances $R_1$ and $R_2$ and also the ratio of the output at the output terminal (*d*) to the input at the point o, that is, the gain can be substantially approached to 1. In the condition, output amplitude $V_b$ of the sawtooth wave shown in FIG. 14(*b*) and output amplitude $V_c$ of the square wave shown in FIG. 14 (*c*) are almost equal to each other. The sawtooth wave shown in FIG. 14(*d*) is introduced into the mixer $M_2$ together with square wave shown in FIG. 14(*e*) and obtained by converting said wave shown in FIG. 14(*d*) in the frequency divider $D_2$ and having a frequency corresponding to ½ of that of said wave *d*, whereby a frequency-divided sawtooth wave such as shown in FIG. 14(*f*is produced at the output terminal *f* of the mixer $M_2$. In the same manner mentioned above, the frequency dividing is repeated in the succeeding stages.

According to the embodiment of FIG. 12, a frequency-divided sawtooth wave can be obtained by mere combination of a square wave frequency divider consisting of a flip-flop circuit and a mixer, so that frequency of the sawtooth wave thus obtained is very accurate and stable without being not affected by conditions of circuit elements and surrounding temperature. Furthermore, since resistance values of the mixing resistors are made to be equal and input and output peak amplitudes of each mixer are made to be equal, it becomes easy to couple adjacent stages, thus causing easy increase of the frequency dividing stages.

Generally, in any electronic musical instrument, the necessary highest one octave tone is produced by a master oscillator and then said tone signal is successively subjected to frequency division, thereby to produce a sound source consisting of a plurality of tone signals. Accordingly, oscillation signal for obtaining the basic highest one octave tone requires an extremely high stability in its frequency, so that it is preferable to cause an oscillation of completely or approximately sinusoidal wave. Furthermore, for the purpose of obtaining the necessary sound source signals by successively subjecting the oscillation frequency to frequency division, it is preferable to connect the master sinusoidal wave oscillator with frequency dividing circuit through a clipper circuit, because when said clipper circuit is used, stable operation of the first stage of the frequency dividing circuits is secured and output of the clipper circuit can be conveniently utilized as the basic sound source signal.

Accordingly, the embodimental circuits of FIGS. 8 and 10 can be improved by combining said circuit with a clipper circuit. One of these improved circuits is illustrated in FIG. 15.

Referring to the circuit of FIG. 15, the circuit comprises a master oscillator 4 capable of producing a sinusoidal wave; a clipper circuit 5 which clips upper and lower parts of the output wave of the oscillator 4 thereby to produce a square wave; a sawtooth wave generator 6 for converting the output wave of the clipper circuit into a sawtooth wave; and frequency dividing circuits 7 and 8, each of which can produce a frequency-divided sawtooth wave and a square wave. Each of the circuits 7 and 8 produces, as will be described later in detail in connection with FIGS. 17 and 18, a sawtooth wave having a frequency of *f*/ 2 and a square wave having a frequency of *f*/ 2 by mixing a sawtooth wave having a frequency *f* and a square wave having a frequency of *f*/ 2.

Referring to FIG. 15, output wave of the master oscillator, said wave being shown in FIG. 16(*a*) is converted to a square wave such as shown in FIG. 16(*b*). This square wave can be led out from output terminal $O_{11}$. This output square wave is applied to the sawtooth wave generator 6, whereby a sawtooth output signal shown in FIG. 16(*c*) and having a frequency *f* equal to that of the output sinusoidal wave of the master oscillator 4, that is, equal to that of the output square wave of the clipper circuit 5 can be obtained at output terminal $O_{12}$. By applying the sawtooth wave signal shown in FIG. 16(*c*) to the frequency divider 7, a frequency divided sawtooth wave shown in FIG. 16(*c*) and having a frequency of *f*/ 2 can be obtained at output terminal $O_{22}$ and a square wave shown in FIG. 16(*d*) and having a frequency of *f*/ 2 can be obtained at the terminal $O_{21}$. In the manner mentioned above, square waves and sawtooth waves having, respectively, successively divided frequencies can be obtained, as in the cases of the embodiments of FIGS. 8 and 10.

FIG. 17 shows an example of actual connection circuit of the embodiment of FIG. 15, but excluding the second stage 8 of the frequency dividing circuit, because said stage 8 is entirely same as that of the first stage 7. The circuit of FIG. 17 consists of a master oscillator 4 which oscillates in a high stable manner and produces a sinusoidal wave; a clipper circuit 5 for converting output wave of the oscillator 4 into a square wave; a sawtooth wave generator 6 for converting output wave of the clipper circuit 5 to a sawtooth wave; and a frequency dividing circuit 7. In the sawtooth wave generator 6, output square wave of the clipper circuit 5 is amplified at transistors $Q_1$ and $Q_2$ and then is converted to a sawtooth wave in the integrating circuit composed of a capacitor C. This sawtooth wave is applied to base of an emitter follower type transistor $Q_3$ of the circuit 6 so as to be buffer amplified, and then applied to base of a mixing transistor in the circuit 7. Furthermore output wave of the sawtooth wave generator 6 (output from $Q_3$) is also applied to transistors $Q_5$ and $Q_6$ of a bistable multivibrator, whereby a square wave having a frequency corresponding to ½ of frequency *f* of the input wave of said multivibrator is obtained. This square wave having a frequency of *f*/ 2 is applied to base of the transistor $Q_4$ and is mixed with the aforementioned sawtooth wave in said transistor $Q_4$, whereby a sawtooth wave having a frequency of *f*/ 2 is produced at terminal $O_{22}$.

In the same manner as mentioned above, when a plurality of necessary stages of the frequency dividing circuits such as the circuit 7 are connected in cascade and master oscillators and their corresponding clipper circuits the number of which corresponds to the number of the necessary most treble octaves are connected to respective multistages consisting of said frequency dividing circuits, each of sound sources necessary for electronic musical instruments can be easily and effectively obtained by combination of sawtooth waves and square waves.

In the circuit of FIG. 17, the trigger input of the square wave frequency dividing circuit 7 composed of the transistors $Q_5$ and $Q_6$ is not limited to sawtooth wave, but pulse wave (square wave) may be effectively adaptable for said trigger input, so that output of the clipper circuit 5 can be directly utilized as said trigger input. This latter case is illustrated in FIG. 18, constitution and operation of the circuit of FIG. 18 are entirely same as those of FIG. 17, except that output of the clipper circuit 5 is directly utilized as the trigger input of the square wave frequency dividing circuit 7.

According to the embodiments of FIGS. 17 and 18, it is possible to obtain sawtooth waves and square waves containing, in plenty, harmonic components by subjecting a sinusoidal wave obtained from a master oscillator and having extremely stable frequency to direct frequency-division. Furthermore, since the circuit elements composing to frequency dividing circuits do not contain frequency components, frequencies of the circuits are not affected by temperature characteristics of said elements and also since circuit-constants of the frequency dividing circuits can be made to be constant, the circuits are very effective for use in the sound source system of any electronic musical instrument which necessitates a plurality of sound sources. Moreover, square waves also can be easily used as the sound source for stopped pipe type musical instrument such as clarinet.

Referring to FIG. 19, the circuit comprises a sawtooth wave generator 1A such as blocking oscillator, which produces a sawtooth wave having a frequency $f$ equal to frequency $f$ of a trigger signal applied to input terminal I thereof; square wave frequency dividers $F_1$, $F_2$ .....$Fn$ such as flip-flop circuit which convert, respectively and successively, their respective trigger input signals into square waves having, respectively, frequencies of $f/2$, $f/4$, ..$f/2_n$; and mixers $m_1$, $m_2$ ..... $m_n$ each receiving, as its inputs a sawtooth wave and a square wave frequencies and amplitudes of which have particular relations to those of said input sawtooth wave, thereby to mix said waves and produce an output sawtooth wave having a frequency of $f/2$ corresponding to ½ of the frequency $f$ of said input wave thereof.

In the circuit of FIG. 19, when a trigger signal such as shown in FIG. 20($a$) and having a frequency $f$ is applied to the input terminal I, a square wave such as shown in FIG. 20($b$) and having a frequency of $f/2$ is sent out from the frequency divider $F_1$, and a sawtooth wave such as shown in FIG. 20($c$) and having a frequency $f$ is sent out from the sawtooth wave generator 1A.

The above-mentioned square wave and sawtooth wave sent out respectively from the frequency divider $F_1$ and generator 1A are introduced in the same amplitude into the mixer $m_1$ and mixed therein, whereby an output sawtooth move such as shown in FIG. 20($d$) and having a frequency of $f/4$ is produced at output terminal $O_{12}$. FIG. 20($g$) shows the manner whereby the wave of FIG. 20($d$) is obtained. The square wave such as shown in FIG. 20($e$) and having a frequency of $f/4$ said wave being obtained at output side of the frequency divider $F_2$, square wave such as shown in FIG. 20($b$) and obtained at output side of the frequency divider $F_1$and a saw wave such as shown in FIG. 20(() and obtained at output side of the sawtooth wave generator 1A are introduced and mixed in the mixer $M_2$ in such a manner that their amplitudes correspond, respectively, to 1:½:½ and their pulse raising times are coincident with one another, whereby a sawtooth wave such as shown in FIG. 20($f$) and having a frequency of $f/4$ can be obtained at output side of the mixer $M_2$. FIG. 20($h$) shows the manner whereby the waveform shown in FIG. 20($f$) is obtained. Characters $b$, $e$, $c$ in FIG. 19 correspond, respectively, to waveforms shown in FIGS. 20($b$), ($e$), and ($e$).

Generally, in the mixer $M_n$, mixing is carried out in such a manner that output square waves of the frequency dividers $F_1$ .....$F_n$, said waves having respectively frequencies $f/2$, $f/2^2$ ....$f/2^n$, are coincident in their pulse raising time, their amplitudes correspond respectively to $1/2^{n-1}$; $1/2^{n-2}$ ..... ¼: ½: 1, and amplitude of sawtooth wave of the sawtooth wave generator 1A becomes $1/2^{n-1}$, whereby sawtooth wave having a frequency of $1/2^n$ can be surely obtained at output terminals $O_n2$.

FIG. 21 shows a modification of the embodiment of FIG. 19, in which sawtooth waves having phases which are respectively reverse to those of the sawtooth waves obtained by the embodiment of FIG. 19 are obtained.

In the circuit of FIG. 21, frequency-divided square waves having respectively phases reverse to those shown in FIG. 20 are produced in the sawtooth wave generator 1A and the frequency dividers $F_1$, $F_2$ ...... $F_n$. Of course, in the case of FIG. 21 also, the frequency-divided square waves and sawtooth waves are mixed in the mixer $m_n$ in such a manner that amplitudes of said frequency-divided square waves are made respectively to be $1/2^{n11}$:$1/2^{n12}$: ..... 1/4:1/21 and the amplitude of the sawtooth wave at the output side of the sawtooth wave generator 1A corresponds to $1/2^{n11}$, whereby a sawtooth wave having a frequency of $f/2^n$ and having a phase reverse to that of the case of FIG. 19 is produced at the output terminals $O_{n2}$.

In the circuits of FIGS. 19 and 21, since only the sawtooth wave generator at the first stage which operates in the state of maximum frequency $f$ contains circuit elements having a relation to the frequency, variation caused by temperature characteristics of the circuit elements and by aging would not occur in the frequency-dividing function of the circuits, and furthermore since almost all of the square wave frequency dividers and mixers can be respectively made of the same composition, design and manufacture of the whole circuit are very convenient. Moreover, output voltage character of the circuit is more excellent than the conventional frequency dividers. Accordingly, the circuits of FIGS. 19 and 21 are very favorably utilized as frequency dividing circuit of any electronic musical instrument requiring a plurality of frequency dividers and sure stability of the frequency dividing operation for a long period of time.

What we claim is:

1. A frequency-divided sawtooth wave generating circuit, which comprises a square wave frequency divider for converting its input sawtooth wave having a frequency $f$ into a square wave having a frequency of $f/2$, and an electric mixer connected at its input side to said frequency divider and to part passing said sawtooth wave thereby to mix said sawtooth wave and square wave therein and to produce at its output terminal a sawtooth wave having a frequency of $f/2$, peak amplitudes of said both waves to be mixed in said mixer being made to be equal or nearly equal to each other.

2. A frequency-divided sawtooth wave generating circuit, as claimed in claim 1, in which an impedance converter having an input terminal supplied with a sawtooth wave signal having a frequency $f$ is used for supplying a sawtooth wave to the square wave frequency divider, a flip-flop circuit connected at its input side to output terminal of said impedance converter is used as said square wave frequency divider, and mixing resistors connected respectively between output terminals of said impedance converter and flip-flop circuit and an intermediate point between said output terminals is used as the electric mixer, peak amplitudes of output signals of said impedance converter and flip-flop circuit being made to be equal or nearly equal to each other and to satisfy approximately the following condition $$R_{M1}+r_{011} = R_{M2}+r_{001} << Z ,$$

where $R_{M1}r_{011}$, $R_{M2}$, $r_{001}$ and Z represent, respectively, value of a mixing resistor $R_{M1}$, value of internal resistance in the flip-flop circuit viewed from output terminal of said circuit, value of another mixing resistor $R_{M2}$, value of internal resistance of the impedance converter viewed from output terminal of said circuit, and a load (in the succeeding stage) impedance at said intermediate point.

3. A frequency-divided sawtooth wave generating circuit obtained by cascade-connecting a plurality of the sawtooth wave generating circuits each being defined in claim 2 into multiple stages, middle point between output terminals of the impedance converter and flip-flop circuit which compose a preceding stage being connected to the input terminal of the impedance converter of the succeeding stage.

4. A frequency-divided sawtooth wave generating circuit, which comprises a sawtooth wave generator, a square wave frequency divider consisting of a flip-flop circuit input terminal of which is connected to output terminal of said generator thereby to produce at its output terminal a square wave having a frequency $f/2$ corresponding to ½ of the frequency $f$ of said sawtooth wave, and a mixing and filtering circuit input side of which is connected to output sides of said generator and flip-flop circuit thereby to produce at its output terminal a sawtooth wave having a frequency $f/2$, said mixing and filtering circuit comprising a mixing element for mixing the sawtooth wave and square wave introduced therein and a high-cut filter element for removing unnecessary pulses included in the output of said mixing and filtering circuit.

5. A frequency-divided sawtooth wave generating circuit, which comprises a sawtooth wave generator (1A) provided with an input terminal to be applied with a trigger signal having a frequency $f$ thereby to produce a sawtooth wave having a frequency $f$; a square wave frequency divider (2A) input terminal of which is connected to the input terminal of said generator to receive thereinto said trigger signal; a mixer 3A connected at its input terminals to output terminals of said frequency divider 2A and sawtooth wave generator 1A thereby to mix outputs of said frequency divider and generator, thus producing a sawtooth wave having a frequency of $f/2$; square wave frequency dividers 2B, 2C, .... 2$n$ which are successively connected in cascade to said frequency divider (2A), each of which having the same structure as that of said frequency divider (2A) and receiving output wave of just preceding divider as its trigger input; mixers 3B, 3C .... 3$n$ each of which is connected respectively and successively to output sides of the mixer of just preceding stage and the corresponding frequency divider thereby to mix output waves of said mixer and frequency divider; thus producing a frequency-divided sawtooth wave; whereby a series of frequency-divided sawtooth waves are obtained.

6. A frequency-divided sawtooth wave generating circuit as claimed in claim 5, in which input terminal of the first square wave frequency divider of the first stage is connected to an output terminal of the sawtooth wave generator 1A, without being directly connected to the input side of said generator.

7. A frequency divided sawtooth wave generating circuit, which comprises a sawtooth wave generator provided with an input terminal supplied with a trigger pulse thereby to carry out triggering thereof; a square wave frequency divider $D_1$ which is connected at its input terminal to output terminal of said generator and converts its input sawtooth wave having a frequency $f$ into a square wave having a frequency of $f/2$; a mixer $M_1$ connected at its one input terminal to output terminal of said generator and at its other input terminal to output terminal of said frequency divider $D_1$, peak amplitudes of two kinds of the input waves of said mixer being made equal or nearly equal to each other, whereby said two kinds of the input waves are mixed in said mixer thereby to produce a sawtooth wave having a frequency of $f/2$, said frequency divider $D_1$ and mixer $M_1$ composing a sawtooth wave frequency dividing circuit of a first stage; a second stage composed of a next sawtooth wave frequency dividing circuit consisting of a second square wave frequency divider $D_2$ and a mixer $M_2$ which have respectively the same structure as those of and are connected in the same manner as the divider and mixer in the first stage, said second stage being connected in cascade to the first stage; and necessary number of succeeding stages each having the same structure as that of said stage, and each of said stages being connected in cascade to the preceding stage.

8. A sound source generating circuit comprising, as its principal circuit element, the same frequency-divided sawtooth wave generating circuit as defined in claim 1, which comprises a master oscillator for producing a sinusoidal oscillation wave; a clipper circuit input terminal of which is connected to output terminal of said master oscillator, said clipper circuit including elements for converting its input wave to a square wave; a sawtooth wave generator which is connected at its input terminal to output terminal of said clipper circuit thereby to produce a sawtooth wave by converting its input square wave into a sawtooth wave; a square wave frequency divider input terminal of which is connected to the output terminal of said clipper circuit to receive thereinto a square wave as its input trigger; a mixer connected at its input side to output sides of said sawtooth wave generator and said frequency divider thereby to mix output waves of said generator and frequency divider, thus producing a frequency-divided sawtooth wave at its output terminal, said frequency divider and mixer composing a first stage of a frequency dividing circuit; and succeeding stages, each consisting of a frequency dividing circuit being equal to that of said first stage, which are successively connected in cascade to said first stage, and said square wave frequency dividers and mixers being provided, respectively with output terminals for deriving a series of sawtooth waves and square waves which are successively divided in their frequencies.

9. A sound source generating circuit as claimed in claim 8, in which input terminal of the first square wave frequency divider of the first stage is connected to an output terminal of the sawtooth wave generator, without being directly connected to the input terminal side of said generator, that is, to the output terminal of the clipper circuit.

10. A frequency-divided sawtooth wave generating circuit, which comprises a sawtooth wave generator for producing a sawtooth wave having a frequency $f$ corresponding to that of input signal thereof; a plurality of frequency-divided sawtooth wave producing stages each consisting of a square wave frequency divider and a mixer, said square wave frequency dividers being successively connected in cascade and each mixer of said stages being connected at its input terminal of square wave frequency divider of the same stage, and output terminals of square wave frequency dividers of all preceding stages, thereby to receive thereinto and mix the output waves at all of said different output terminals, peak amplitudes of said different kinds of the output waves having predetermined relations between them, whereby sawtooth waves having respectively and successively divided frequencies are respectively produced at outputs of said mixers.